US012632664B2

(12) United States Patent
Gupta et al.

(10) Patent No.: US 12,632,664 B2
(45) Date of Patent: May 19, 2026

(54) DESCRIPTION-DRIVEN TASK-ORIENTED DIALOGUE MODELING

(71) Applicant: Google LLC, Mountain View, CA (US)

(72) Inventors: Raghav Gupta, Mountain View, CA (US); Yuan Cao, Mountain View, CA (US); Abhinav Kumar Rastogi, Mountain View, CA (US); Harrison J. Lee, Seattle, WA (US); Jeffrey Liangjie Zhao, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 449 days.

(21) Appl. No.: 18/148,045

(22) Filed: Dec. 29, 2022

(65) Prior Publication Data

US 2024/0220732 A1 Jul. 4, 2024

(51) Int. Cl.
*G06F 40/35* (2020.01)
*G06F 16/36* (2019.01)

(52) U.S. Cl.
CPC ............ *G06F 40/35* (2020.01); *G06F 16/367* (2019.01)

(58) Field of Classification Search
CPC ... G10L 15/22; G10L 2015/223; G10L 13/02; G10L 15/1822; G10L 15/08; G10L 2015/088; G10L 15/26; G10L 15/063; G10L 17/04; G10L 17/18; G10L 15/02; G10L 2015/0631; G06F 40/30; G06F 40/35; G06F 3/167; G06F 16/90332;
(Continued)

(56) References Cited

U.S. PATENT DOCUMENTS

| | | | |
|---|---|---|---|
| 10,540,967 B2 * | 1/2020 | Perez | G06F 40/35 |
| 10,860,629 B1 * | 12/2020 | Gangadharaiah | ... G06F 16/3329 |
| 11,314,790 B2 * | 4/2022 | Chang | G06F 16/24564 |

(Continued)

OTHER PUBLICATIONS

Rastogi et al, Towards scalable multi-domain conversational agents: The schema-guided dialogue dataset:, 2020, InProceedings of the AAAI conference on artificial intelligence Apr. 3, 2020 (vol. 34, No. 05, pp. 8689-8696). (Year: 2020).*

(Continued)

*Primary Examiner* — Olujimi A Adesanya
(74) *Attorney, Agent, or Firm* — Gray Ice Higdon

(57) ABSTRACT

Example methods include determining an input schema representation for a task. The schema representation comprises natural language descriptions of slot and intent descriptions, wherein respective indices are associated with each of the slot descriptions and each of the intent descriptions. The methods include determining a contextual representation comprising a concatenation of a history of dialog sequences exchanged between a user and a service agent, wherein the dialog sequences describe a context for the task. The methods include training, a sequence-to-sequence language model and based on a concatenation of the input schema representation and the contextual representation, to predict a sequence of dialog states for an input task, wherein the sequence of dialog states comprises an assignment of values to slots for which the user has indicated a preference in dialog sequences corresponding to the input task. The methods include providing the trained sequence-to-sequence language model.

20 Claims, 8 Drawing Sheets

┌─ 800

810 Determining an input schema representation for a task, wherein the input schema representation comprises natural language descriptions of a first plurality of slot descriptions and a second plurality of intent descriptions, wherein respective indices are associated with each of the first plurality of slot descriptions and each of the second plurality of intent descriptions

820 Determining a contextual representation comprising a concatenation of a history of dialog sequences exchanged between a user and a service agent, wherein the dialog sequences describe a context for the task

830 Training, a sequence-to-sequence language model and based on a concatenation of the input schema representation and the contextual representation, to predict a sequence of dialog states for an input task, wherein the sequence of dialog states comprises an assignment of values to slots for which the user has indicated a preference in dialog sequences corresponding to the input task

840 Providing the trained sequence-to-sequence language model

(58) Field of Classification Search
CPC ...... G06F 40/284; G06F 40/56; G06F 40/205; G06F 40/279; G06F 40/20; G06F 40/295
See application file for complete search history.

(56) References Cited

U.S. PATENT DOCUMENTS

| | | | | |
|---|---|---|---|---|
| 11,341,335 | B1 * | 5/2022 | Crook | G06F 9/547 |
| 11,604,929 | B2 * | 3/2023 | Rastogi | G06F 3/167 |
| 11,804,225 | B1 * | 10/2023 | Agrawal | G10L 15/1815 |
| 11,948,563 | B1 * | 4/2024 | Liu | H04L 51/52 |
| 2015/0095033 | A1 * | 4/2015 | Boies | G10L 15/1815 |
| | | | | 704/257 |
| 2018/0307745 | A1 * | 10/2018 | Bachrach | G06N 3/006 |
| 2020/0218780 | A1 * | 7/2020 | Mei | G06F 40/30 |
| 2020/0320988 | A1 | 10/2020 | Rastogi et al. | |
| 2021/0174798 | A1 | 6/2021 | Wu et al. | |
| 2022/0068255 | A1 | 3/2022 | Chen | |
| 2022/0139384 | A1 | 5/2022 | Wu et al. | |
| 2022/0199079 | A1 | 6/2022 | Hanson | |
| 2023/0120940 | A1 | 4/2023 | Qiu | |

OTHER PUBLICATIONS

Han et al, "Multiwoz 2.3: A multi-domain task-oriented dialogue dataset enhanced with annotation corrections and co-reference annotation", Jun. 2021, In Natural Language Processing and Chinese Computing: 10th CCF International Conference, NLPCC 2021, Qingdao, China, pp. 1-12 (Year: 2021).*

Liang et al, "Attention guided dialogue state tracking with sparse supervision" Jan. 2021, arXiv preprint arXiv:2101.11958. Jan. 28, 2021, pp. 1-10 (Year: 2021).*

Cao et al, "A comparative study on schema-guided dialogue state tracking", Jun. 2021, InProceedings of the 2021 conference of the north american chapter of the association for computational linguistics: Human language technologies Jun. 2021 (pp. 782-796). (Year: 2021).*

Zhao et al, "Talk to papers: Bringing neural question answering to academic search", 2020, arXiv preprint arXiv:2004.02002. Apr. 4, 2020, pp. 1-7 (Year: 2020).*

Kim et al, "Dialogue State Tracking with Zero-Shot and Few-Shot Learning for Generalization: A Review.", Aug. 2022, In2022 International Conference on Platform Technology and Service (PlatCon) Aug. 22, 2022 (pp. 75-79). IEEE. (Year: 2022).*

Campagna et al., "Zero-Shot Transfer Learning with Synthesized Data for Multi-Domain Dialogue State Tracking," Proceedings of the 58th Annual Meeting of the Association for Computational Linguistics, Jul. 5-10, 2020, pp. 122-132.

Feng et al., "A Sequence-to-Sequence Approach to Dialogue State Tracking," Proceedings of the 59th Annual Meeting of the Association for Computational Linguistics and 11th International Conference on Natural Language Processing, Aug. 1-6, 2021, pp. 1714-1725.

Gupta et al., "Show, Don't Tell: Demonstrations Outperform Descriptions for Schema-Guided Task-Oriented Dialogue," arXiv:2204.04327v1, Apr. 8, 2022, 9 pages.

Kapelonis et al., "A Multi-Task BERT Model for Schema-Guided Dialogue State Tracking," arXiv:2207.00828v1, Jul. 2, 2022, 5 pages.

Lee et al., "Dialogue State Tracking with a Language Model using Schema-Driven Prompting," Proceedings of the 2021 Conference on Empirical Methods in Natural Language Processing, Nov. 7-11, 2021, pp. 4937-4949.

Lee et al., "SGD-X: A Benchmark for Robust Generalization in Schema-Guided Dialogue Systems," arXiv:2110.06800v3, Aug. 23, 2022, 13 pages.

Li et al., "Zero-shot Generalization in Dialog State Tracking through Generative Question Answering," arXiv:2101.08333v1, Jan. 20, 2021, 11 pages.

Lin et al., "Leveraging Slot Descriptions for Zero-Shot Cross-Domain Dialogue State Tracking," arXiv:2105.04222v1, May 1, 2021, 9 pages.

Reynolds et al., "Prompt Programming for Large Language Models: Beyond the Few-Shot Paradigm," arXiv2102.07350v1, Feb. 15, 2021, 10 pages.

Zhao et al., "Description-Driven Task-Oriented Dialog Modeling," arXiv:2201.08904v1, Jan. 21, 2022.

Zhao et al., "Simple and Effective Zero-Shot Task-Oriented Dialogue," Google AIBlog, Apr. 13, 2022, 6 pages.

* cited by examiner

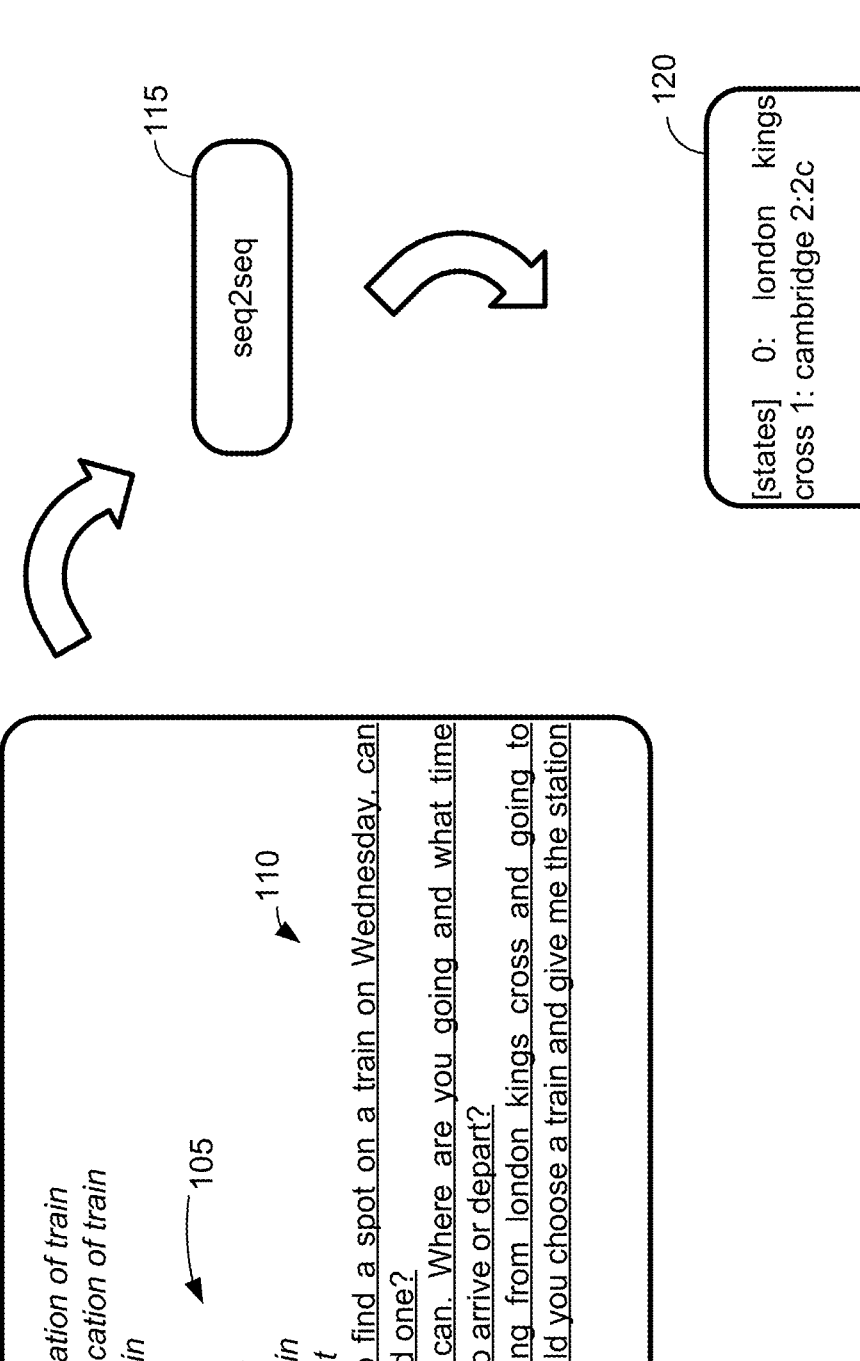

0: departure location of train
1: destination location of train
2: day of the train
2a) Monday
2b) Tuesday
2c) Wednesday
I1: look for a train
I2: change ticket
[user] I need to find a spot on a train on Wednesday, can you help me find one?
[system] yes I can. Where are you going and what time would you like to arrive or depart?
[user] I'm leaving from london kings cross and going to cambridge. Could you choose a train and give me the station it leaves from?

105

110

115 seq2seq

120

[states]    0:   london   kings cross 1: cambridge 2:2c

[intents] i1

FIG. 1

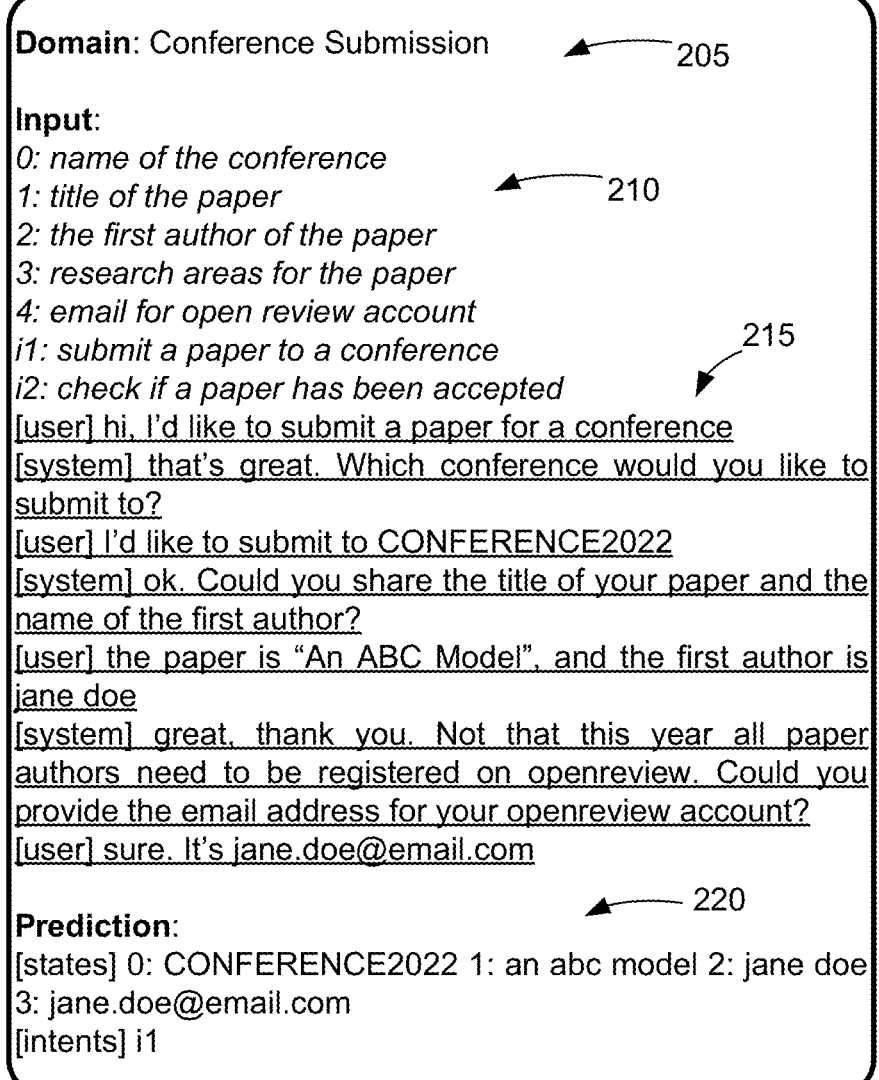

Domain: Conference Submission                    205

Input:
*0: name of the conference*
*1: title of the paper*                     210
*2: the first author of the paper*
*3: research areas for the paper*
*4: email for open review account*
*i1: submit a paper to a conference*                215
*i2: check if a paper has been accepted*
[user] hi, I'd like to submit a paper for a conference
[system] that's great. Which conference would you like to submit to?
[user] I'd like to submit to CONFERENCE2022
[system] ok. Could you share the title of your paper and the name of the first author?
[user] the paper is "An ABC Model", and the first author is jane doe
[system] great, thank you. Not that this year all paper authors need to be registered on openreview. Could you provide the email address for your openreview account?
[user] sure. It's jane.doe@email.com 220
Prediction:
[states] 0: CONFERENCE2022 1: an abc model 2: jane doe 3: jane.doe@email.com
[intents] i1

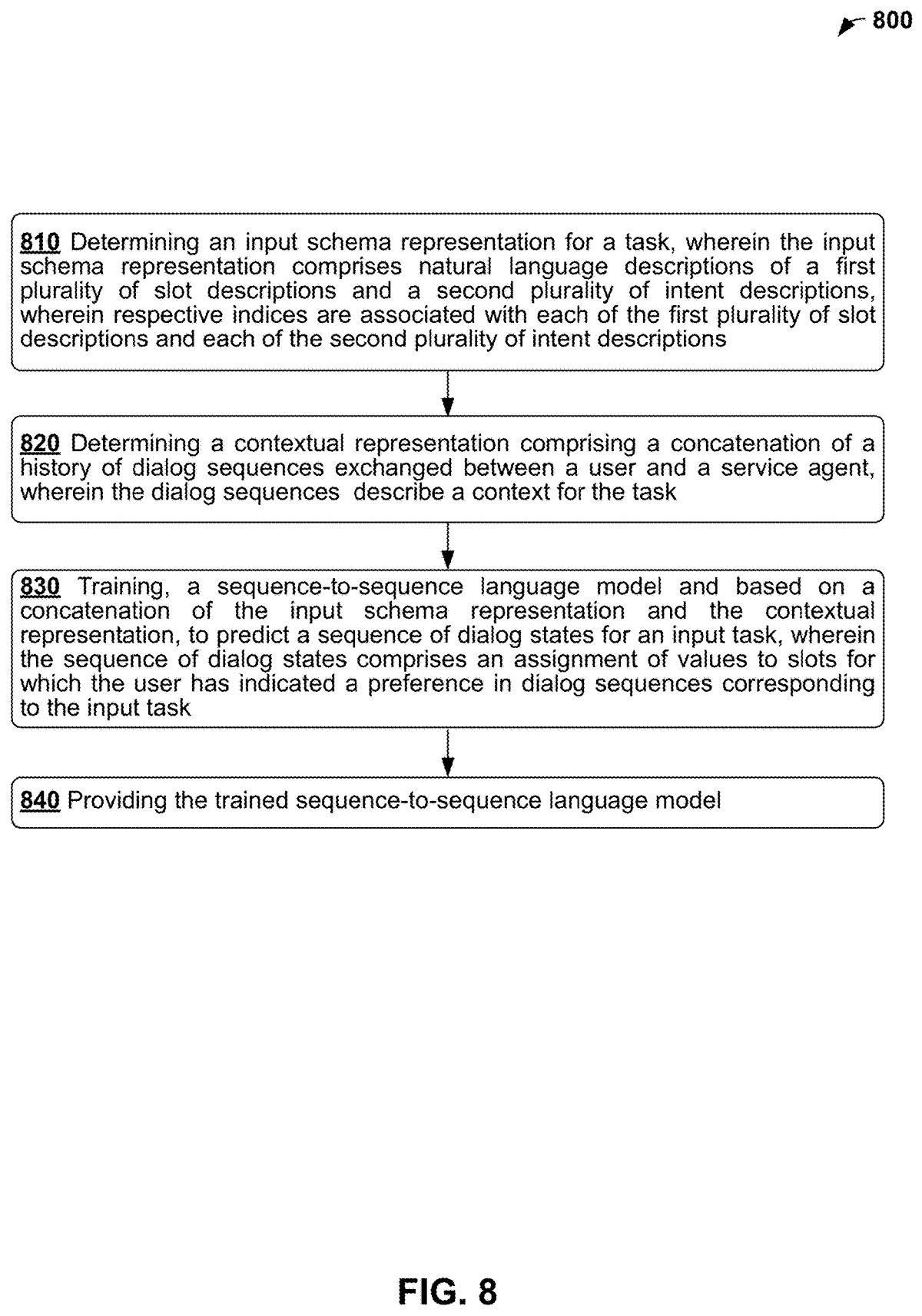

810 Determining an input schema representation for a task, wherein the input schema representation comprises natural language descriptions of a first plurality of slot descriptions and a second plurality of intent descriptions, wherein respective indices are associated with each of the first plurality of slot descriptions and each of the second plurality of intent descriptions

820 Determining a contextual representation comprising a concatenation of a history of dialog sequences exchanged between a user and a service agent, wherein the dialog sequences describe a context for the task

830 Training, a sequence-to-sequence language model and based on a concatenation of the input schema representation and the contextual representation, to predict a sequence of dialog states for an input task, wherein the sequence of dialog states comprises an assignment of values to slots for which the user has indicated a preference in dialog sequences corresponding to the input task

840 Providing the trained sequence-to-sequence language model

FIG. 8

DESCRIPTION-DRIVEN TASK-ORIENTED DIALOGUE MODELING

BACKGROUND

Many modern computing devices, including mobile phones, personal computers, and tablets, include task-oriented dialogue (TOD) systems that identify key information from conversations for the completion of given tasks. Such information is conventionally specified in terms of intents and slots contained in task-specific ontology or schemata.

SUMMARY

Building universal TOD systems that can seamlessly operate across multiple domains/APIs and generalize to new ones with minimal supervision and maintenance can be challenging. Traditional TOD systems are unable to adapt to new verticals for an existing TOD system because the intents and slots are hard-coded into the model. The techniques described herein enable addition of new verticals. In some aspects, natural language descriptions for schema elements can be leveraged to enable such TOD systems. Accordingly, in one embodiment, slots and intents can be replaced with natural language descriptions.

For example, the schemata used by TOD systems are generally designed in a manner that the naming convention for slots and intents is not uniform across tasks, and may not be effective in conveying semantics associated with the task. This can lead to models that memorize arbitrary patterns in data, resulting in suboptimal performance and unnecessary generalization. Furthermore, the need to collect training data separately for each vertical, in order to train machine learning models, can be tedious and expensive.

In one aspect, vertical and/or application programming interface (API) schemata may be modified by replacing names or notations with natural language descriptions. Building language description-driven systems based on such a paradigm can exhibit an improved understanding of task specifications, lead to a higher performance on state tracking, result in improved data efficiency, and effective zero-shot transfer to unseen tasks. Accordingly, a Description Driven Dialog State Tracking (D3ST) model is described that is based on schema descriptions and an "index-picking" mechanism.

In one aspect, a computer-implemented method for description-driven dialog state tracking in a task-oriented dialog system is provided. The method includes determining an input schema representation for a task, wherein the input schema representation comprises natural language descriptions of a first plurality of slot descriptions and a second plurality of intent descriptions, wherein respective indices are associated with each of the first plurality of slot descriptions and each of the second plurality of intent descriptions. The method additionally includes determining a contextual representation comprising a concatenation of a history of dialog sequences exchanged between a user and a service agent, wherein the dialog sequences describe a context for the task. The method also includes training, a sequence-to-sequence language model and based on a concatenation of the input schema representation and the contextual representation, to predict a sequence of dialog states for an input task, wherein the sequence of dialog states comprises an assignment of values to slots for which the user has indicated a preference in dialog sequences corresponding to the input task. The method also includes providing the trained sequence-to-sequence language model.

In another aspect, a computing device is provided. The computing device includes one or more processors and data storage. The data storage has stored thereon computer-executable instructions that, when executed by one or more processors, cause the computing device to carry out operations. The operations include determining an input schema representation for a task, wherein the input schema representation comprises natural language descriptions of a first plurality of slot descriptions and a second plurality of intent descriptions, wherein respective indices are associated with each of the first plurality of slot descriptions and each of the second plurality of intent descriptions. The operations additionally include determining a contextual representation comprising a concatenation of a history of dialog sequences exchanged between a user and a service agent, wherein the dialog sequences describe a context for the task. The operations also include training, a sequence-to-sequence language model and based on a concatenation of the input schema representation and the contextual representation, to predict a sequence of dialog states for an input task, wherein the sequence of dialog states comprises an assignment of values to slots for which the user has indicated a preference in dialog sequences corresponding to the input task. The operations also include providing the trained sequence-to-sequence language model.

In another aspect, an article of manufacture is provided. The article of manufacture includes one or more computer readable media having computer-readable instructions stored thereon that, when executed by one or more processors of a computing device, cause the computing device to carry out operations. The operations include determining an input schema representation for a task, wherein the input schema representation comprises natural language descriptions of a first plurality of slot descriptions and a second plurality of intent descriptions, wherein respective indices are associated with each of the first plurality of slot descriptions and each of the second plurality of intent descriptions. The operations additionally include determining a contextual representation comprising a concatenation of a history of dialog sequences exchanged between a user and a service agent, wherein the dialog sequences describe a context for the task. The operations also include training, a sequence-to-sequence language model and based on a concatenation of the input schema representation and the contextual representation, to predict a sequence of dialog states for an input task, wherein the sequence of dialog states comprises an assignment of values to slots for which the user has indicated a preference in dialog sequences corresponding to the input task. The operations also include providing the trained sequence-to-sequence language model.

In another aspect, a system is provided. The system includes means for determining an input schema representation for a task, wherein the input schema representation comprises natural language descriptions of a first plurality of slot descriptions and a second plurality of intent descriptions, wherein respective indices are associated with each of the first plurality of slot descriptions and each of the second plurality of intent descriptions; means for determining a contextual representation comprising a concatenation of a history of dialog sequences exchanged between a user and a service agent, wherein the dialog sequences describe a context for the task; means for training, a sequence-to-sequence language model and based on a concatenation of the input schema representation and the contextual representation, to predict a sequence of dialog states for an input task, wherein the sequence of dialog states comprises an assignment of values to slots for which the user has indicated a preference in dialog sequences corresponding to the input task; and means for providing the trained sequence-to-sequence language model.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 1 illustrates an example of description driven dialogue state tracking (D3ST), in accordance with example embodiments.

FIG. 2 illustrates an example of D3ST performing zero-shot transfer to a hypothetical "Conference Submission" domain, in accordance with example embodiments.

FIG. 8 is a flowchart of a method, in accordance with example embodiments.

DETAILED DESCRIPTION

Figure 3:
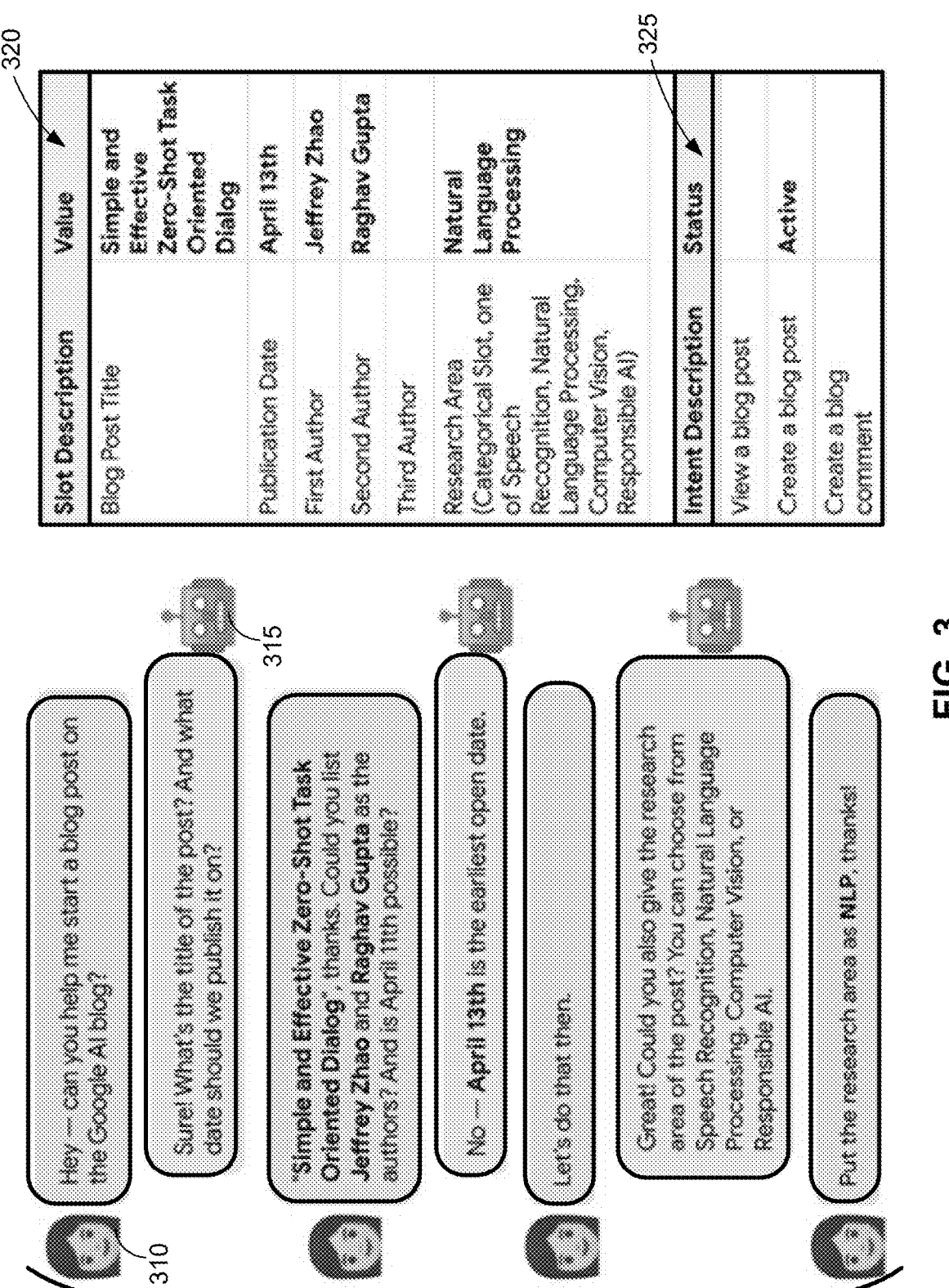
FIG. 3 illustrates an example of D3ST performing zero-shot transfer to a hypothetical "blogpost" domain, in accordance with example embodiments.

Conversational agents are deployed to integrate with a number of different services to perform a wide variety of tasks. Such tasks may involve making travel reservations, such as hotel, flight, train, cruise, car rentals, and so forth. Also, for example, the tasks may involve playing media content, such as music, videos, etc. As another example, the tasks may involve reading excerpts from a book, a newspaper, telling jokes, submitting articles for publication in conferences and journals, creating a travel itinerary, finding routes, assisting with shopping, and so forth.

Generally, TOD systems are configured for a specific task, and it may be challenging to make them universally applicable to a wide variety of different tasks. Often, separate training, based on separate training data, may be needed to train the TOD system. Such training is generally based on a single task-specific ontology. An ontology may be represented as a list of possible user intents (e.g., if the user wants to book a flight, if the user wants to play some music, etc.) and possible parameter slots to extract from the conversation (e.g., the date of the flight, the name of a song, and so on). A rigid ontology can be limiting, preventing the TOD system from generalizing to new tasks or domains. For instance, a TOD model trained on a certain ontology may be able to detect the intents in that ontology, but may lack an ability to generalize such knowledge to unseen intents. This may be true for new ontologies that overlap with existing ontologies known to the agent. For example, an agent may already know how to reserve train tickets. However, adding the ability to reserve airline tickets may require training on new data related to the airline reservation system. Ideally, it is desirable for a service agent to be able to leverage existing knowledge from one ontology, and apply it to new ones.

Some new benchmarks, such as the Schema Guided Dialogue (SGD) dataset, have been designed to evaluate the ability to generalize to unseen tasks, by distilling each ontology into a schema of slots and intents. In the SGD setting, TOD models are trained on multiple schemas, and evaluated on how well they generalize to unseen ones, instead of how well they overfit to a single ontology.

To address this technical problem of generalizing a model to apply to unseen tasks based on training in one domain, a sequence-to-sequence (seq2seq) approach toward zero-shot transfer for dialogue modeling is described herein. For example, a description-driven Task-Oriented Dialogue model is described. The model may be conditioned on contextual information, such as slot and intent descriptions. Results on multiple dialogue state tracking benchmarks indicate that by doing away with fixed schemas and ontologies of existing models, the approach described herein can lead to state-of-the-art results on the dialogue state tracking task with more efficient models.

In some examples, a trained TOD model can work on a variety of computing devices, including but not limited to, mobile computing devices (e.g., smart phones, tablet computers, cell phones, laptop computers), stationary computing devices (e.g., desktop computers), and server computing devices.

In one example, a copy of the trained model can reside on a mobile computing device. The trained model can generate a predicted output that predicts the slots and intents. In other examples, the trained model is not resident on the mobile computing device; rather, the mobile computing device provides the input to a remotely-located trained model (e.g., via the Internet or another data network). The remotely-located model can process the input and provide the output to the mobile computing device. In other examples, non-mobile computing devices can also use the trained model.

As such, the herein-described techniques can improve dialog state tracking and generalize to unseen tasks, and/or domains, thereby enhancing the actual and/or perceived quality and effectiveness of digital virtual assistants. Enhancing the actual and/or perceived quality and effectiveness of digital virtual assistants can therefore provide benefits by making services more accurate and efficient. These techniques are flexible, and so can apply a wide variety of tasks and domains.

Introduction and Overview

The design of a task-oriented dialog (TOD) system conventionally starts with defining a schema specifying the information required to complete its tasks, such as a list of relevant slots and intents. These slots and intents may often appear as abbreviated notations, such as "train-leave at" and "hotel-internet," to indicate the domain of a task and the information it captures. Models that are trained using such schemata may be dependent on these abbreviations, making it challenging to extract the semantics of the task related conversation. This is especially true for decoder-only or sequence-to sequence (seq2seq) TOD models, which are generally trained with supervision to predict dialogue belief states as sequences of these notations.

Such an approach may have several disadvantages. For example, the element notations may fail to convey semantic (and possibly ambiguous) meaning for the requirements of the slot, potentially undermining language understanding. As another example, task-specific abstract schema notations make it easy for a model to overfit on observed tasks, and fail to transfer to unseen ones, even in situations where there may be sufficient semantic similarity between the two. Also, for example, creating notations for each slot and intent may complicate the schema design process.

Described herein are TOD schemata with intuitive, human-readable, and semantically rich natural language descriptions, rather than abbreviated notations used to design TOD models. For example, the phrase "hotel-internet" may be described in natural language as "whether the hotel has internet". This would be easier for both the designer of the TOD system when specifying the task ontology, and can also play an important role in improving model quality and data efficiency.

Description-Driven Task-Oriented Dialogue

Description-Driven Dialog State Tracking (D3ST) is described. In some embodiments, schema descriptions are indexed and concatenated as prefixes to a seq2seq model, which then learns to predict active schema element indices and corresponding values. In addition, an index-picking mechanism reduces the chance of the model overfitting to specific schema descriptions. The trained model performs well on benchmarks including Multi-domain Wizard-of-Oz (MultiWOZ), and exhibits strong few- and zero-shot transfer capability to unseen tasks. Natural language descriptions may generally lead to better quality over abbreviated notations.

Some existing models leverage language prompts for data efficiency and quality improvement for dialogue modeling. For example, descriptions or instructions related to the dialogue tasks may be provided to a model, and slot descriptions and a small number of examples of slot values may be utilized for learning slot representations for spoken language understanding. Also, for example, slot descriptions may be provided as additional inputs to the model. In some conventional models, the descriptions may be extended to a more detailed format by including task instructions, constraints, and prompts. However, unlike the techniques described herein, such models predict slot values one-by-one in turn, which can become increasingly inefficient as the number of slots increases, and may be prone to oversampling slot values since most slots are inactive at any stage during a dialogue. In contrast, the techniques described herein can predict all states in a single pass, which is more efficient.

Some conventional state tracking models operate as a question answering (QA) or machine reading (MR) model, where models may be provided questions about each slot, and the model may predict the slot values as answers to these questions. Such models may be fine-tuned on extractive QA or MR datasets, and by converting slot prediction into QA pairs the models may perform zero-shot state tracking on dialogue datasets. The question generation procedure however, can be more costly when compared to the use of schema descriptions, as described herein.

For example, D3ST may be configured to use a seq2seq model for dialogue state tracking, and may rely on descriptions of schema items to instruct the model. A seq2seq model is a general and versatile architecture that can handle formats of language instructions. The seq2seq model has been shown to be an effective approach for DST, and as a generic model architecture that can be initialized from a publicly available pretrained checkpoint.

For D3ST, a seq2seq model such as a T5 model may be used, with associated pretrained checkpoints of different sizes, such as a base model with 220 million parameters, a large model with 770 million parameters, and an extra large model with 11 billion parameters. As described herein, D3ST relies on schema descriptions for dialogue state tracking.

D3ST prompts the input sequence with slot and intent descriptions, allowing the T5 model to attend to both the contextual information and the conversation. An ability to generalize can be derived from a formulation of these descriptions. For example, instead of using a name for each slot, a random index may be assigned to every slot. For categorical slots (i.e., slots that only take values from a small, predefined set), possible values may be arbitrarily enumerated and then listed. The same approach may be applied to intents, and together these descriptions may form the schema representation to be included in an input string. The input string may be concatenated with the conversation text and fed into the T5 model. The target output is the belief state and user intent, again identified by their assigned indices.

Such an index-based approach enables the model to predict conversation contexts using an index associated with a slot, and not a specific slot. By randomizing the index, each slot may be assigned between different examples. This prevents the model from learning specific schema information. For instance, a slot with index 0 may be assigned to a "Train Departure" slot in one example and to a "Train Destination" slot in another example. Accordingly, the model is trained to use the slot description given in index 0 to find the correct value, instead of overfitting to a specific schema. With such a configuration, a model that receives training data related to different tasks or domains can be trained to learn to generalize the action of belief state tracking and intent prediction across tasks and/or domains.

FIG. 1 illustrates an example of description driven dialogue state tracking (D3ST), in accordance with example embodiments. The schema descriptions are indexed and concatenated as prefixes. For example, the italicized portion 105 illustrates an indexed schema description sequence as a prefix. An example conversation context is illustrated by the underlined portion 110. The prefixes are provided to a seq2seq model 115, which then learns to predict active schema element indices and corresponding values, and outputs state prediction sequence 120 that comprises the predicted states and intents.

In particular, given a set of descriptions corresponding to slots and intents specified by a schema, let $$d_i^{slot}, i = 1 \ldots N \text{ and } d_j^{intent}, j = 1 \ldots M$$

be the descriptions for slots and intents respectively, where N and M are the numbers of slots and intents. Let $$u_t^{usr} \text{ and } u_t^{sys}$$

be the user and system utterance at time t, respectively.

The input to the encoder may include the slot descriptions, intent descriptions, and conversation context concatenated into a single string. The slot descriptions may have the following format:

$$0 : d_0^{slot} \ldots 1 : d_s^{slot} \qquad \text{(Eqn. 1)}$$

Similarly, the intent descriptions may have the following format:

$$i0 : d_0^{int} \dots iJ : d_J^{int} \qquad \text{(Eqn. 2)}$$

Note that 0 . . . I and i0 . . . iJ are indices that are assigned to each of the slot and intent descriptions respectively. Here, "i" may denote a literal character to differentiate intent indices from those for slots. In some embodiments, in an effort to prevent the model from memorizing an association between a specific index:description pair, the assignment of indices may be randomized to descriptions for each example during training. Such a dynamic construction trains the model to consider descriptions, rather than treating inputs as constant strings, to make generalizable predictions. The conversation context may include an entire conversation between a user and a service agent (e.g., a virtual assistant) concatenated together, with leading [user] and [sys] tokens before each user and system utterance, signaling the speaker of each utterance.

$$[usr]u_0^{usr}[sys]u_0^{sys} \dots [usr]u_T^{usr}[sys]u_T^{sys} \qquad \text{(Eqn. 3)}$$

A decoder for the seq2seq model may generate a sequence of dialogue states in the format:

$$[states] \; a_0^s : v_0^s \dots a_M^s : v_M^s [intents]a_0^i \dots a_N^i \qquad \text{(Eqn. 4)}$$

where $$a_m^s$$

is the index of the $m^{th}$ active slot and there are M active slots in all, $v_m^s$ is its corresponding value.

$$a_n^i$$

is the index of the $n^{th}$ active intent and N is the number of active intents. This way the model can be trained to identify active schema elements with abstract indices, as the element order is randomized during training. In some embodiments, inactive elements may not be generated.

In some embodiments, one or more slots may be categorical, that is, they may have predefined candidate values for the model to choose from. For example "whether the hotel provides free Wi-Fi or not" may have categorical values "yes" and "no". To improve categorical slot prediction accuracy, possible slot values may be enumerated together with respective slot descriptions. For example, assuming that the $i^{th}$ slot is categorical and has k values $v_a, \dots, v_k$, a corresponding input format may be:

$$i : d_i^{slot} ia)v_a \dots ik)v_k \qquad \text{(Eqn. 5)}$$

where ia) . . . ik) are indices assigned to each of the values. Assuming this slot is active with its third value ($v_c$) being mentioned, then the corresponding prediction may have the format i:ic). In some embodiments, a) . . . k) may be adopted as value indices or even completely discard indexing for categorical values. However, such shared indexing across categorical slots may cause selection ambiguity when some values (like "true" or "false") are shared by multiple categorical slots. Accordingly, slot-specific indices ia) . . . ik) may be applied to constrain index-picking within the $i^{th}$ slot value range.

As described herein, the model relies on an understanding of schema descriptions for the identification of active slots and intents. Also, for example, the model can be trained to select indices corresponding to active slots, intents, and/or categorical values, instead of generating these schema elements. Such an "index-picking" mechanism, based on schema description understanding, can discourage the model from memorizing training schemata, while encouraging the model to zero-shot transfer to unseen tasks. Unlike conventional models based on schema descriptions that are trained to generate values for each slot in turn (even if a slot is inactive), the techniques described herein enable prediction of multiple active slot-value pairs along with intents with a single decoding pass, making the inference procedure more efficient. Additionally, providing more detailed human-readable descriptions enables the language model to have a better understanding of task requirements, and leads to improved few-shot performance.

FIG. 2 illustrates an example of D3ST performing zero-shot transfer to a hypothetical "Conference Submission" domain, in accordance with example embodiments. For example, a seq2seq model may have been trained on a task related to railway reservations. The trained seq2seq model may be applied to an unseen domain 205, such as a "conference submission" task, where an author of a research article may want to submit the article for consideration at a forthcoming conference. The input to the seq2seq model may include the italicized portion 210 that illustrates an indexed schema description sequence as a prefix. Conversation context is illustrated by the underlined portion 215. The prefixes are provided to the trained seq2seq model, which then learns to predict active schema element indices and corresponding values, and outputs state prediction sequence 220 that comprises the predicted states and intents.

FIG. 3 illustrates an example of D3ST performing zero-shot transfer to a hypothetical "blogpost" domain, in accordance with example embodiments. An example dialog 305 between a user 310 seeking a service, and a virtual assistant 315, is illustrated. Slot-value pairs 320 illustrate predicted slot descriptions with corresponding values. Also illustrated are intent-status pairs 325 that illustrate intent descriptions with corresponding categorical values.

Training the D3ST Model

In some embodiments, a training dataset such as Multi-WOZ 2.1-2.4, and Schema-guided Dialogue (SGD) may be used. Generally, the MultiWOZ dataset may include annotation errors, and pre-processing procedures may be applied, such as a TRADE script to pre-process MultiWOZ 2.1. However, pre-processing may not be applied to versions 2.2-2.4 for reproducibility and fair comparison with existing results. In some embodiments, Joint Goal Accuracy (JGA) may be used as an evaluation metric. The JGA measures the percentage of turns across conversations for which states are correctly predicted by the model.

In some embodiments, model training may be performed using an open-source T5 code base, and the associated pretrained T5 1.1 checkpoints. Models of different sizes may be used, such as a base model with 250 million parameters, a large model with 800 million parameters, and an extra large model with 11 billion parameters, initialized from the corresponding pretrained checkpoints. In some embodiments, each experiment may be run on 64 TPU v3 chips. For fine-tuning, a batch size of 32 may be used with a constant learning rate of 1e-4 across all experiments. The input and output sequence lengths may be 1024 and 512 tokens, respectively.

In some embodiments, the slot and intent descriptions included in the original MultiWOZ and SGD datasets may be used as inputs $$\left(d_i^{slot} \text{ and } d_i^{int}\right)$$

to the model. For MultiWOZ, schema descriptions across all domains may be used as model prefix, and the input length limit may be set to 2048. To avoid ambiguity between descriptions from different domains, domain names may be added as part of the descriptions. For example, for a "hotel-parking" slot, the description can be "hotel-parking facility at the hotel". For SGD, descriptions from domains relevant to each turn may be used.

In some embodiments, different schema description types may be combined with different model sizes. The different types of descriptions may include human-readable language descriptions, schema element names (e.g., abbreviations) as defined in the original schema, and random strings. The random string descriptions may be generated by randomly permuting character sequences of the original element names.

Use of language descriptions typically outperforms other types of descriptions, since natural and human-readable descriptions contain richer semantics and are aligned with the pretraining objective, enabling the seq2seq model to perform better. Element names may be less readable by the model than full descriptions, but may retain some semantics. Random strings may pose an additional challenge of identifying the correct slot id for each value to predict, since each example has a random shuffling of the slot ids. In some embodiments, training "large" models on random names may be challenging to converge.

In some embodiments, using random strings may undermine quality significantly. In general, meaningless inputs may diminish model performance and lead to less generalization. However, instructing the model with semantically rich representations, in particular, language descriptions, produces a more effective model.

As described herein, human-readable language descriptions may be effectively used in place of abbreviated or arbitrary notations for schema definition in TOD modeling. Such a schema representation may include more meaningful information for a strong language model to leverage, leading to better performance and improved data efficiency. The D3ST model relies on schema descriptions and an index picking mechanism to indicate active slots or intents. D3ST achieves superior quality on MultiWOZ and SGD. Using language descriptions outperforms abbreviations or arbitrary notations. Also, the description driven approach improves data-efficiency, and enables effective zero-shot transfer to unseen tasks and domains. Using language for schema description improves model robustness, as can be measured by the SGD-X benchmark.

Training Machine Learning Models for Generating Inferences/Predictions

Figure 4:
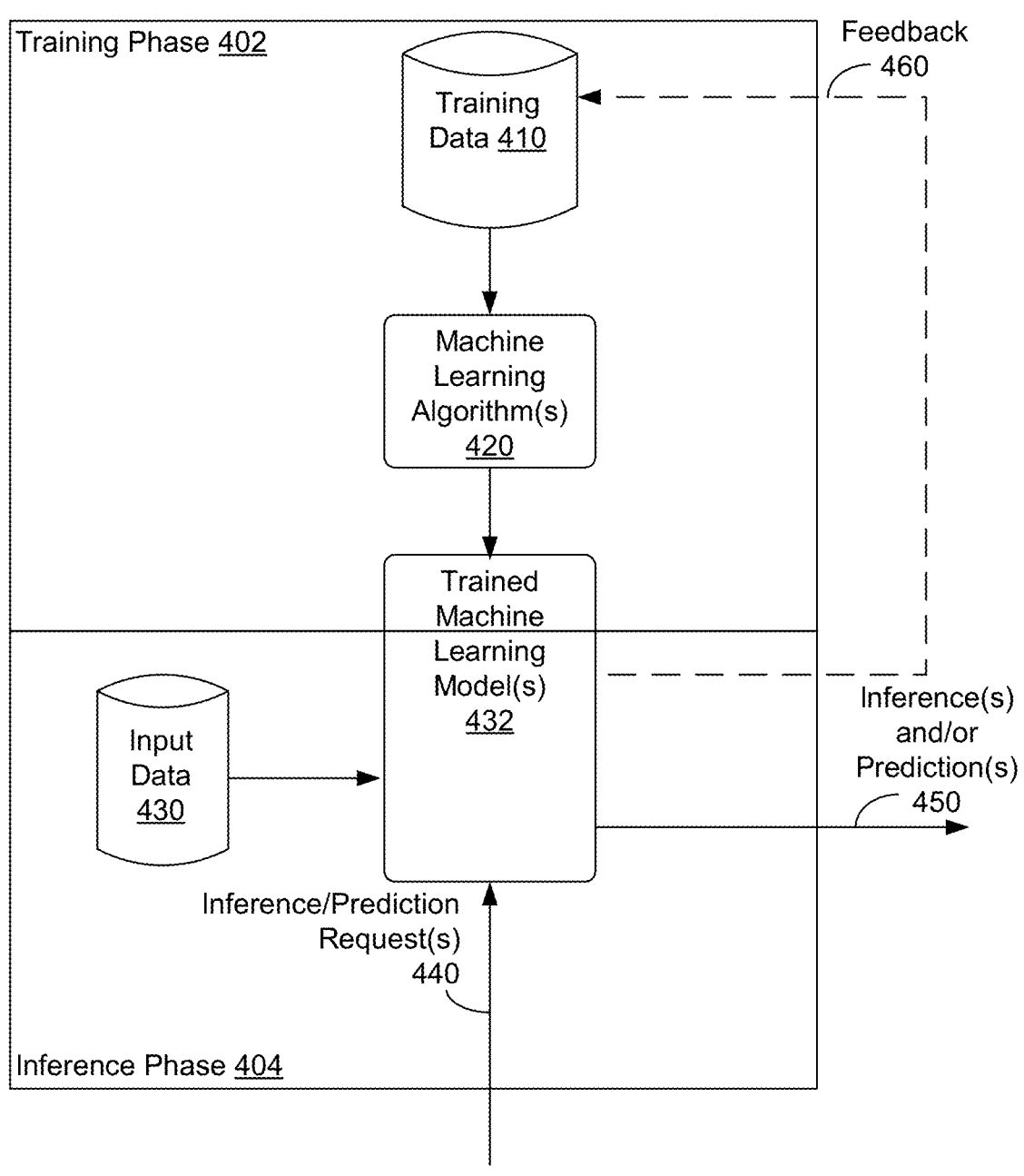
FIG. 4 is a diagram illustrating training and inference phases of a machine learning model, in accordance with example embodiments.

FIG. 4 shows diagram 400 illustrating a training phase 402 and an inference phase 404 of trained machine learning model(s) 432, in accordance with example embodiments. Some machine learning techniques involve training one or more machine learning algorithms on an input set of training data to recognize patterns in the training data and provide output inferences and/or predictions about (patterns in the) training data. The resulting trained machine learning algorithm can be termed as a trained machine learning model. For example, FIG. 4 shows training phase 402 where one or more machine learning algorithms 420 are being trained on training data 410 to become trained machine learning model 432. Then, during inference phase 404, trained machine learning model 432 can receive input data 430 (e.g., input prompt and context) and one or more inference/prediction requests 440 (perhaps as part of input data 430) and responsively provide as an output one or more inferences and/or predictions 450 (e.g., predict a sequence of dialogue states).

As such, trained machine learning model(s) 432 can include one or more models of one or more machine learning algorithms 420. Machine learning algorithm(s) 420 may include, but are not limited to: an artificial neural network (e.g., a convolutional neural networks, a recurrent neural network, a Bayesian network, a hidden Markov model, a Markov decision process, a logistic regression function, a support vector machine, a suitable statistical machine learning algorithm, a large language model, and/or a heuristic machine learning system). Machine learning algorithm(s) 420 may be supervised or unsupervised, and may implement any suitable combination of online and offline learning.

In some examples, machine learning algorithm(s) 420 and/or trained machine learning model(s) 432 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 420 and/or trained machine learning model(s) 432. In some examples, trained machine learning model(s) 432 can be trained, reside and execute to provide inferences on a particular computing device, and/or otherwise can make inferences for the particular computing device.

During training phase 402, machine learning algorithm(s) 420 can be trained by providing at least training data 410 as training input using unsupervised, supervised, semi-supervised, and/or weakly supervised learning techniques. Unsupervised learning involves providing a portion (or all) of training data 410 to machine learning algorithm(s) 420 and machine learning algorithm(s) 420 determining one or more output inferences based on the provided portion (or all) of training data 410. Supervised learning involves providing a portion of training data 410 to machine learning algorithm(s) 420, with machine learning algorithm(s) 420 determining one or more output inferences based on the provided portion of training data 410, and the output inference(s) are either accepted or corrected based on correct results associated with training data 410. In some examples, supervised learning of machine learning algorithm(s) 420 can be governed by a set of rules and/or a set of labels for the training input, and the set of rules and/or set of labels may be used to correct inferences of machine learning algorithm(s) 420.

Semi-supervised learning involves having correct labels for part, but not all, of training data 410. During semi-supervised learning, supervised learning is used for a portion of training data 410 having correct results, and unsupervised learning is used for a portion of training data 410 not having correct results. In some examples, machine learning algorithm(s) 420 and/or trained machine learning model(s) 432 can be trained using other machine learning techniques, including but not limited to, incremental learning and curriculum learning.

In some examples, machine learning algorithm(s) 420 and/or trained machine learning model(s) 432 can use transfer learning techniques. For example, transfer learning techniques can involve trained machine learning model(s) 432 being pre-trained on one set of data and additionally trained using training data 410. More particularly, machine learning algorithm(s) 420 can be pre-trained on data from one or more computing devices and a resulting trained machine learning model provided to a particular computing device, where the particular computing device is intended to execute the trained machine learning model during inference phase 404. Then, during training phase 402, the pre-trained machine learning model can be additionally trained using training data 410, where training data 410 can be derived from kernel and non-kernel data of the particular computing device. This further training of the machine learning algorithm(s) 420 and/or the pre-trained machine learning model using training data 410 of the particular computing device's data can be performed using either supervised or unsupervised learning. Once machine learning algorithm(s) 420 and/or the pre-trained machine learning model has been trained on at least training data 410, training phase 402 can be completed. The trained resulting machine learning model can be utilized as at least one of trained machine learning model(s) 432.

In particular, once training phase 402 has been completed, trained machine learning model(s) 432 can be provided to a computing device, if not already on the computing device. Inference phase 404 can begin after trained machine learning model(s) 432 are provided to the computing device.

During inference phase 404, trained machine learning model(s) 432 can receive input data 430 and generate and output one or more corresponding inferences and/or predictions 450 about input data 430. As such, input data 430 can be used as an input to trained machine learning model(s) 432 for providing corresponding inference(s) and/or prediction(s) 450 to kernel components and non-kernel components. For example, trained machine learning model (s) 432 can generate inference(s) and/or prediction(s) 450 in response to one or more inference/prediction requests 440. In some examples, trained machine learning model(s) 432 can be executed by a portion of other software. For example, trained machine learning model(s) 432 can be executed by an inference or prediction daemon to be readily available to provide inferences and/or predictions upon request. Input data 430 can include data from the computing device executing trained machine learning model(s) 432 and/or input data from one or more computing devices other than the computing device.

Input data 430 can be different for different models. For example, for the D3ST model, input data 430 can include natural language descriptions of slots intents, along with corresponding values, and the conversation history as context.

Inference(s) and/or prediction(s) 450 can include a sequence of dialog states, and/or other output data produced by trained machine learning model(s) 432 operating on input data 430 (and training data 410). In some examples, trained machine learning model(s) 432 can use output inference(s) and/or prediction(s) 450 as input feedback 460. Trained machine learning model(s) 432 can also rely on past inferences as inputs for generating new inferences.

Seq2seq model 115 can be an example of machine learning algorithm(s) 420. After training, the trained version of seq2seq model 115 can be an example of trained machine learning model(s) 432. In this approach, an example of inference/prediction request(s) 440 can be a request to predict a sequence of dialog states, and a corresponding example of inferences and/or prediction(s) 450 can be an output indicating the predicted sequence of dialog states. In some examples, a given computing device can include the trained neural network 300, perhaps after training neural network 300. Then, the given computing device can receive requests to predict a sequence of dialog states, and use the trained neural network to generate a prediction of the sequence of dialog states.

In some examples, two or more computing devices can be used to provide the sequence of dialog states sequence of dialog states to a second computing device. Then, the second computing device can use the trained versions of neural networks, perhaps after training, to generate a prediction of the sequence of dialog states, and respond to the requests from the first computing device for the prediction of the sequence of dialog states, upon reception of responses to the requests, the first computing device can provide the requested output (e.g., using a user interface and/or a display, a printed copy, an electronic communication, etc.).

Example Data Network

Figure 5:
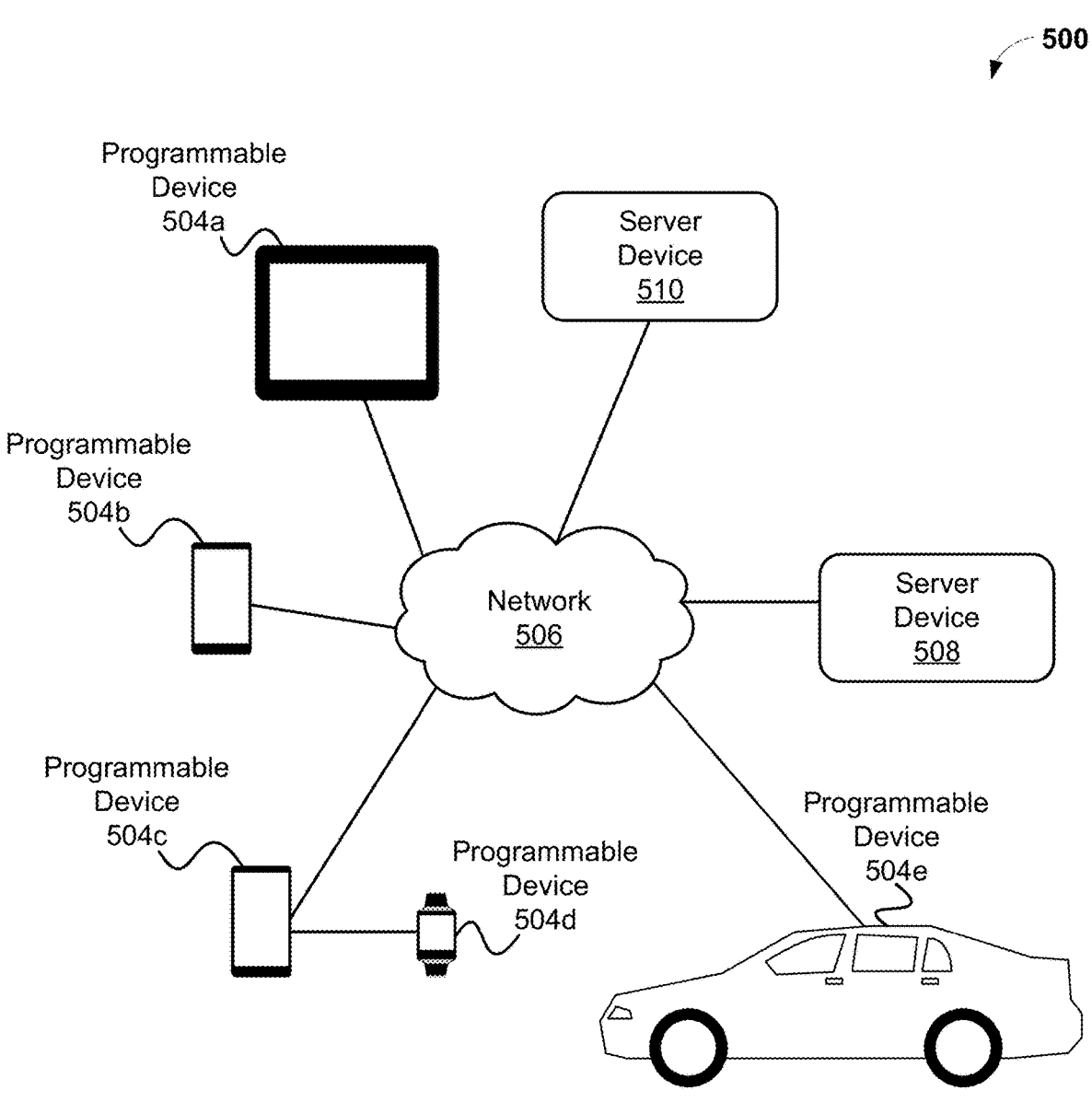
FIG. 5 depicts a distributed computing architecture, in accordance with example embodiments.

FIG. 5 depicts a distributed computing architecture 500, in accordance with example embodiments. Distributed computing architecture 500 includes server devices 508, 510 that are configured to communicate, via network 506, with programmable devices 504a, 504b, 504c, 504d, 504e. Network 506 may correspond to a local area network (LAN), a wide area network (WAN), a WLAN, a WWAN, a corporate intranet, the public Internet, or any other type of network configured to provide a communications path between networked computing devices. Network 506 may also correspond to a combination of one or more LANs, WANs, corporate intranets, and/or the public Internet.

Although FIG. 5 only shows five programmable devices, distributed application architectures may serve tens, hundreds, or thousands of programmable devices. Moreover, programmable devices 504a, 504b, 504c, 504d, 504e (or any additional programmable devices) may be any sort of computing device, such as a mobile computing device, desktop computer, wearable computing device, head-mountable device (HMD), network terminal, a mobile computing device, and so on. In some examples, such as illustrated by programmable devices 504a, 504b, 504c, 504e, programmable devices can be directly connected to network 506. In other examples, such as illustrated by programmable device 504d, programmable devices can be indirectly connected to network 506 via an associated computing device, such as programmable device 504c. In this example, programmable device 504c can act as an associated computing device to pass electronic communications between programmable device 504d and network 506. In other examples, such as illustrated by programmable device 504e, a computing device can be part of and/or inside a vehicle, such as a car, a truck, a bus, a boat or ship, an airplane, etc. In other examples not shown in FIG. 5, a programmable device can be both directly and indirectly connected to network 506.

Server devices 508, 510 can be configured to perform one or more services, as requested by programmable devices 504a-504e. For example, server device 508 and/or 510 can provide content to programmable devices 504a-504e. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 508 and/or 510 can provide programmable devices 504a-504e with access to software for database, search, computation, graphical, audio, video, World Wide Web/Internet utilization, and/or other functions. Many other examples of server devices are possible as well.

Computing Device Architecture

Figure 6:
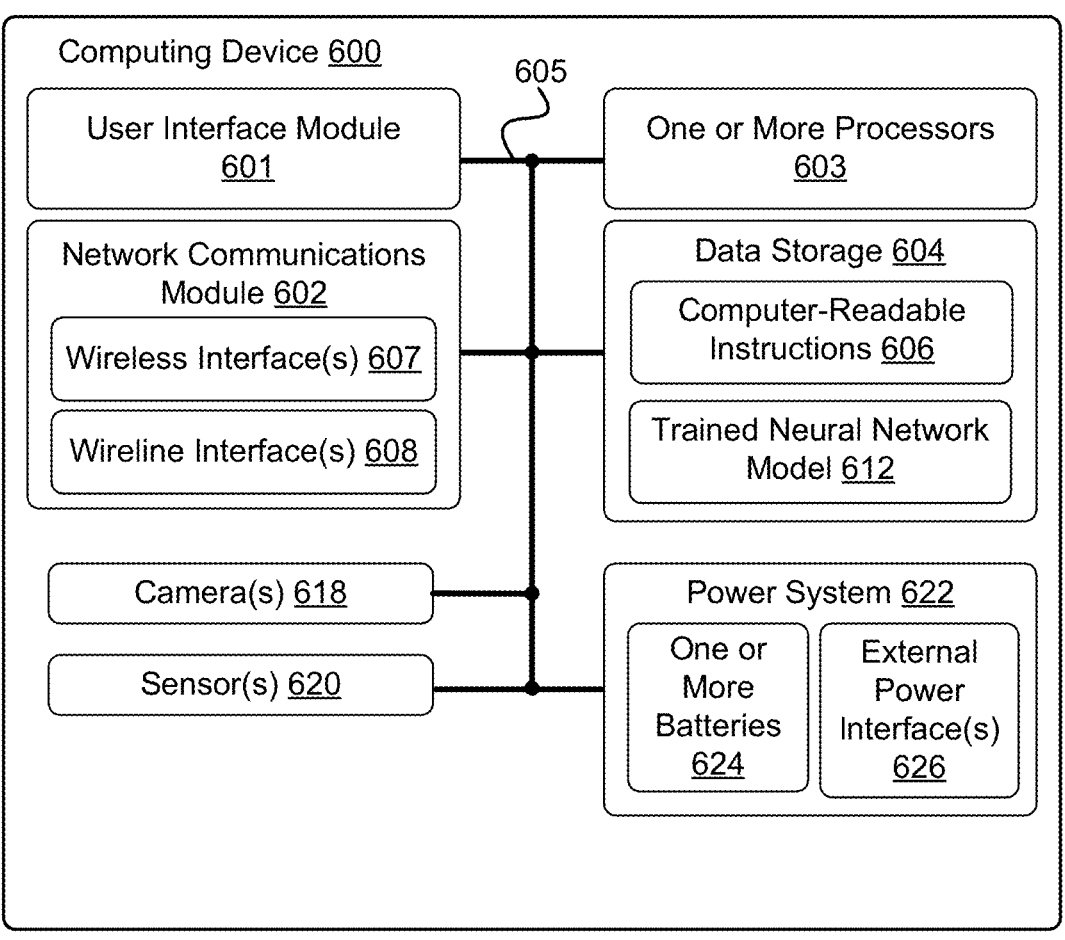
FIG. 6 is a block diagram of a computing device, in accordance with example embodiments.

FIG. 6 is a block diagram of an example computing device 600, in accordance with example embodiments. In particular, computing device 600 shown in FIG. 6 can be configured to perform at least one function of and/or related to seq2seq model 115, and/or method 800.

Computing device 600 may include a user interface module 601, a network communications module 602, one or more processors 603, data storage 604, one or more cameras 618, one or more sensors 620, and power system 622, all of which may be linked together via a system bus, network, or other connection mechanism 605.

User interface module 601 can be operable to send data to and/or receive data from external user input/output devices, including an application programming interface (API). For example, user interface module 601 can be configured to send and/or receive data to and/or from user input devices such as a touch screen, a computer mouse, a keyboard, a keypad, a touch pad, a trackball, a joystick, a voice recognition module, and/or other similar devices. User interface module 601 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 601 can also be configured to generate audible outputs, with devices such as a speaker, speaker jack, audio output port, audio output device, earphones, and/or other similar devices. User interface module 601 can further be configured with one or more haptic devices that can generate haptic outputs, such as vibrations and/or other outputs detectable by touch and/or physical contact with computing device 600. In some examples, user interface module 601 can be used to provide a graphical user interface (GUI) for utilizing computing device 600. For example, user interface module 601 can be used to provide task processing options, menus, editable forms, selectable icons, and so forth. Also, for example, user interface module 601 can be used to receive user selection of user choices. The user interface module 601 can be used to provide a textual or audio interface for a user to communicate with a service agent, such as a virtual assistant configured to assist with the completion of a task.

Network communications module 602 can include one or more devices that provide one or more wireless interfaces 607 and/or one or more wireline interfaces 608 that are configurable to communicate via a network. Wireless interface(s) 607 can include one or more wireless transmitters, receivers, and/or transceivers, such as a Bluetooth™ transceiver, a Zigbee® transceiver, a Wi-Fi™ transceiver, a WiMAX™ transceiver, an LTE™ transceiver, and/or other type of wireless transceiver configurable to communicate via a wireless network. Wireline interface(s) 608 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications module 602 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 603 can include one or more general purpose processors, and/or one or more special purpose processors (e.g., digital signal processors, tensor processing units (TPUs), graphics processing units (GPUs), application specific integrated circuits, etc.). One or more processors 603 can be configured to execute computer-readable instructions 606 that are contained in data storage 604 and/or other instructions as described herein.

Data storage 604 can include one or more non-transitory computer-readable storage media that can be read and/or accessed by at least one of one or more processors 603. The one or more computer-readable storage media can include volatile and/or non-volatile storage components, such as optical, magnetic, organic or other memory or disc storage, which can be integrated in whole or in part with at least one of one or more processors 603. In some examples, data storage 604 can be implemented using a single physical device (e.g., one optical, magnetic, organic or other memory or disc storage unit), while in other examples, data storage 604 can be implemented using two or more physical devices.

Data storage 604 can include computer-readable instructions 606 and perhaps additional data. In some examples, data storage 604 can include storage required to perform at least part of the herein-described methods, scenarios, and techniques and/or at least part of the functionality of the herein-described devices and networks. In some examples, data storage 604 can include storage for a trained neural network model 612 (e.g., a model of seq2seq models 115, 325, etc.). In particular of these examples, computer-readable instructions 606 can include instructions that, when executed by processor(s) 603, enable computing device 600 to provide for some or all of the functionality of trained neural network model 612.

In some examples, computing device 600 can include one or more cameras 618. Camera(s) 618 can include one or more image capture devices, such as still and/or video cameras, equipped to capture videos. The one or more images can be one or more images utilized in video imagery.

Camera(s) 618 can capture light and/or electromagnetic radiation emitted as visible light, infrared radiation, ultraviolet light, and/or as one or more other frequencies of light.

In some examples, computing device 600 can include one or more sensors 620. Sensors 620 can be configured to measure conditions within computing device 600 and/or conditions in an environment of computing device 600 and provide data about these conditions. For example, sensors 620 can include one or more of: (i) sensors for obtaining data about computing device 600, such as, but not limited to, a thermometer for measuring a temperature of computing device 600, a battery sensor for measuring power of one or more batteries of power system 622, and/or other sensors measuring conditions of computing device 600; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 600, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 600, such as, but not limited to, an infrared sensor, an optical sensor, a light sensor, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 600, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 620 are possible as well.

Power system 622 can include one or more batteries 624 and/or one or more external power interfaces 626 for providing electrical power to computing device 600. Each battery of the one or more batteries 624 can, when electrically coupled to the computing device 600, act as a source of stored electrical power for computing device 600. One or more batteries 624 of power system 622 can be configured to be portable. Some or all of one or more batteries 624 can be readily removable from computing device 600. In other examples, some or all of one or more batteries 624 can be internal to computing device 600, and so may not be readily removable from computing device 600. Some or all of one or more batteries 624 can be rechargeable. For example, a rechargeable battery can be recharged via a wired connection between the battery and another power supply, such as by one or more power supplies that are external to computing device 600 and connected to computing device 600 via the one or more external power interfaces. In other examples, some or all of one or more batteries 624 can be non-rechargeable batteries.

One or more external power interfaces 626 of power system 622 can include one or more wired-power interfaces, such as a USB cable and/or a power cord, that enable wired electrical power connections to one or more power supplies that are external to computing device 600. One or more external power interfaces 626 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 626, computing device 600 can draw electrical power from the external power source the established electrical power connection. In some examples, power system 622 can include related sensors, such as battery sensors associated with the one or more batteries or other types of electrical power sensors.

Cloud-Based Servers

Figure 7:
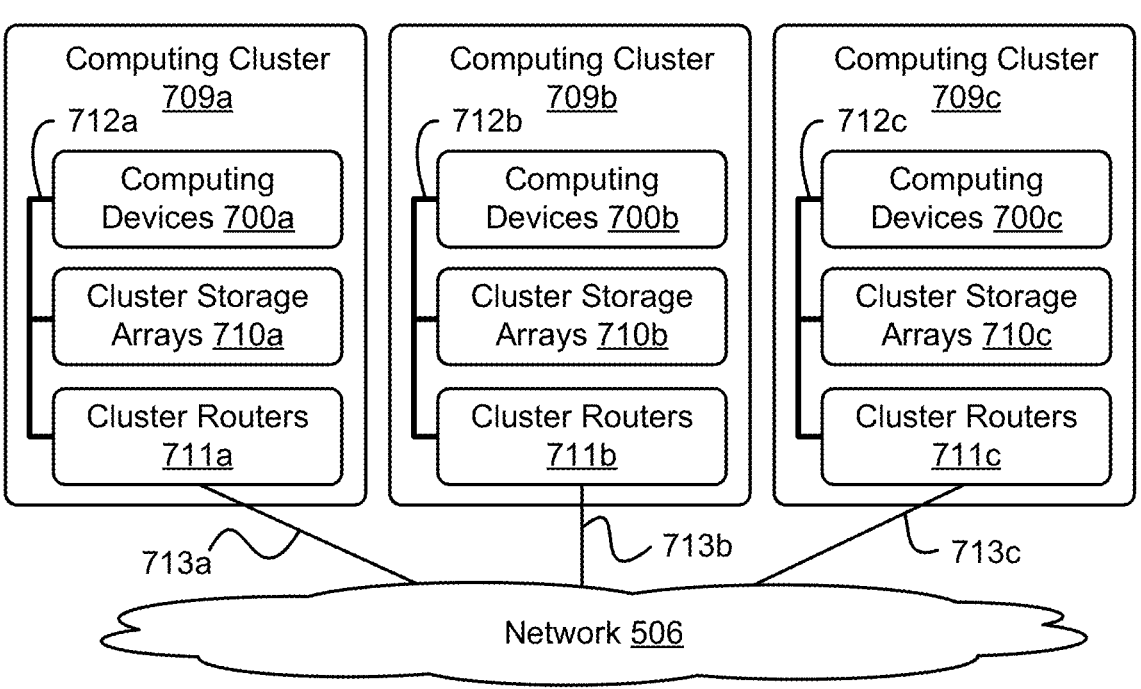
FIG. 7 depicts a network of computing clusters arranged as a cloud-based server system, in accordance with example embodiments.

FIG. 7 depicts a network 506 of computing clusters 709*a*, 709*b*, 709*c* arranged as a cloud-based server system in accordance with an example embodiment. Computing clusters 709*a*, 709*b*, 709*c* can be cloud-based devices that store program logic and/or data of cloud-based applications and/or services; e.g., perform at least one function of and/or related to seq2seq model 115, and/or method 800.

In some embodiments, computing clusters 709*a*, 709*b*, 709*c* can be a single computing device residing in a single computing center. In other embodiments, computing clusters 709*a*, 709*b*, 709*c* can include multiple computing devices in a single computing center, or even multiple computing devices located in multiple computing centers located in diverse geographic locations. For example, FIG. 7 depicts each of computing clusters 709*a*, 709*b*, and 709*c* residing in different physical locations.

In some embodiments, data and services at computing clusters 709*a*, 709*b*, 709*c* can be encoded as computer readable information stored in non-transitory, tangible computer readable media (or computer readable storage media) and accessible by other computing devices. In some embodiments, computing clusters 709*a*, 709*b*, 709*c* can be stored on a single disk drive or other tangible storage media, or can be implemented on multiple disk drives or other tangible storage media located at one or more diverse geographic locations.

FIG. 7 depicts a cloud-based server system in accordance with an example embodiment. In FIG. 7, functionality of seq2seq models 115, 325, and/or a computing device can be distributed among computing clusters 709*a*, 709*b*, 709*c*. Computing cluster 709*a* can include one or more computing devices 700*a*, cluster storage arrays 710*a*, and cluster routers 711*a* connected by a local cluster network 712*a*. Similarly, computing cluster 709*b* can include one or more computing devices 700*b*, cluster storage arrays 710*b*, and cluster routers 711*b* connected by a local cluster network 712*b*. Likewise, computing cluster 709*c* can include one or more computing devices 700*c*, cluster storage arrays 710*c*, and cluster routers 711*c* connected by a local cluster network 712*c*.

In some embodiments, each of computing clusters 709*a*, 709*b*, and 709*c* can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 709*a*, for example, computing devices 700*a* can be configured to perform various computing tasks of a neural network, a seq2seq model, and/or a computing device. In one embodiment, the various functionalities of a neural network, a seq2seq model, and/or a computing device can be distributed among one or more of computing devices 700a, 700b, 700c. Computing devices 700b and 700c in respective computing clusters 709b and 709c can be configured similarly to computing devices 700a in computing cluster 709a. On the other hand, in some embodiments, computing devices 700a, 700b, and 700c can be configured to perform different functions.

In some embodiments, computing tasks and stored data associated with a neural network, a seq2seq model, and/or a computing device can be distributed across computing devices 700a, 700b, and 700c based at least in part on the processing requirements of a neural network, a seq2seq model, and/or a computing device, the processing capabilities of computing devices 700a, 700b, 700c, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 710a, 710b, 710c of computing clusters 709a, 709b, 709c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a neural network, a seq2seq model, and/or a computing device can be distributed across computing devices 700a, 700b, 700c of computing clusters 709a, 709b, 709c, various active portions and/or backup portions of these components can be distributed across cluster storage arrays 710a, 710b, 710c. For example, some cluster storage arrays can be configured to store one portion of the data of a neural network, a seq2seq model, and/or a computing device, while other cluster storage arrays can store other portion(s) of data of a neural network, a seq2seq model, and/or a computing device. Also, for example, some cluster storage arrays can be configured to store the data of a first neural network, while other cluster storage arrays can store the data of a second and/or third neural network. Additionally, some cluster storage arrays can be configured to store backup versions of data stored in other cluster storage arrays.

Cluster routers 711a, 711b, 711c in computing clusters 709a, 709b, 709c can include networking equipment configured to provide internal and external communications for the computing clusters. For example, cluster routers 711a in computing cluster 709a can include one or more internet switching and routing devices configured to provide (i) local area network communications between computing devices 700a and cluster storage arrays 710a via local cluster network 712a, and (ii) wide area network communications between computing cluster 709a and computing clusters 709b and 709c via wide area network link 713a to network 506. Cluster routers 711b and 711c can include network equipment similar to cluster routers 711a, and cluster routers 711b and 711c can perform similar networking functions for computing clusters 709b and 709b that cluster routers 711a perform for computing cluster 709a.

In some embodiments, the configuration of cluster routers 711a, 711b, 711c can be based at least in part on the data communication requirements of the computing devices and cluster storage arrays, the data communications capabilities of the network equipment in cluster routers 711a, 711b,

711c, the latency and throughput of local cluster networks 712a, 712b, 712c, the latency, throughput, and cost of wide area network links 713a, 713b, 713c, and/or other factors that can contribute to the cost, speed, fault-tolerance, resiliency, efficiency and/or other design criteria of the moderation system architecture.

Example Methods of Operation

FIG. 8 is a flowchart of a method 800, in accordance with example embodiments. Method 800 can be executed by a computing device, such as computing device 600. Method 800 can begin at block 810, where the method involves determining an input schema representation for a task, wherein the input schema representation comprises natural language descriptions of a first plurality of slot descriptions and a second plurality of intent descriptions, wherein respective indices are associated with each of the first plurality of slot descriptions and each of the second plurality of intent descriptions.

At block 820, the method involves determining a contextual representation comprising a concatenation of a history of dialog sequences exchanged between a user and a service agent, wherein the dialog sequences describe a context for the task.

At block 830, the method involves training, a sequence-to-sequence language model and based on a concatenation of the input schema representation and the contextual representation, to predict a sequence of dialog states for an input task, wherein the sequence of dialog states comprises an assignment of values to slots for which the user has indicated a preference in dialog sequences corresponding to the input task.

At block 840, the method involves providing the trained sequence-to-sequence language model.

In some embodiments, the one or more slot descriptions may be associated with respective random indices.

In some embodiments, the predicted sequence of dialog states may be based on a respective random index assigned to a slot.

In some embodiments, the one or more intent descriptions may include one or more categorical slots that arbitrarily enumerate predefined values with slot descriptions.

In some embodiments, the natural language descriptions may be semantic descriptions.

Some embodiments involve receiving, via an application programming interface (API) for a task processor, API schemata for a dialog associated with a particular task. Such embodiments also involve applying the trained sequence-to-sequence language model to predict a particular sequence of dialog states for the particular task.

In some embodiments, the training of the sequence-to-sequence language model may be based on a first type of task, and wherein the applying of the trained sequence-to-sequence language model is based on a second type of task different from the first type of task.

In some embodiments, the first type of task may correspond to a railway reservation task, and the second first type of task may correspond to a research conference paper submission task.

In some embodiments, the first type of task may correspond to a railway reservation task, and the second first type of task may correspond to a blog post generation task.

In some embodiments, the training of the sequence-to-sequence language model may be based on a Schema-guided Dialogue (SGD) dataset.

In some embodiments, the training of the sequence-to-sequence language model may be based on a MultiWOZ dataset. Such embodiments may further involve applying a pre-processing script to the MultiWOZ dataset to correct one or more annotation errors.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are provided for explanatory purposes and are not intended to be limiting, with the true scope being indicated by the following claims.

What is claimed is:

1. A computer-implemented method for improving the functionality of task-oriented dialog systems, comprising:
  obtaining, by a processor, training data for training a sequence-to-sequence language model, wherein the training data comprises:
    an input schema representation for a task, wherein the input schema representation comprises natural language descriptions of a first plurality of slot descriptions and a second plurality of intent descriptions, wherein respective indices are randomly assigned to each of the first plurality of slot descriptions and each of the second plurality of intent descriptions;
    a contextual representation comprising a concatenation of a history of dialog sequences exchanges between a user and a service agent, wherein the dialog sequences describe a task; and
    an input task comprising an unlabeled dialog;
  training, by the processor, the sequence-to-sequence language model, wherein training the sequence-to-sequence language model comprises:
    processing, by the processor, a concatenation of the input schema representation and the contextual representation, to generate a predicted sequence of dialog states for the input task by selecting a sequence of slot-value pairs corresponding to the randomly assigned indices and predicting their corresponding values for the unlabeled dialog, thereby enabling the sequence-to-sequence language model to perform zero-shot generalization to an unseen domain without requiring new annotated training data; and
    updating, by the processor, and based on the processing, the sequence-to-sequence language model; and
  providing, by the processor, the trained sequence-to-sequence language model for deployment on one or more processors of a task-oriented dialog system to dynamically predict a dialogue state for a new task using an index-picking mechanism based on randomly assigned indices.

2. The computer-implemented method of claim 1, wherein the one or more slot descriptions are associated with respective random indices.

3. The computer-implemented method of claim 2, wherein the predicted sequence of dialog states is based on a respective random index assigned to a slot.

4. The computer-implemented method of claim 1, wherein the one or more intent descriptions comprise one or more categorical slots that arbitrarily enumerate predefined values with slot descriptions.

5. The computer-implemented method of claim 1, wherein the natural language descriptions are semantic descriptions.

6. The computer-implemented method of claim 1, further comprising:

receiving, via an application programming interface (API) for a task processor, API schemata for a dialog associated with a particular task; and applying the trained sequence-to-sequence language model to predict a particular sequence of dialog states for the particular task.

7. The computer-implemented method of claim 6, wherein the training of the sequence-to-sequence language model is based on a first type of task, and wherein the applying of the trained sequence-to-sequence language model is based on a second type of task different from the first type of task.

8. The computer-implemented method of claim 7, wherein the first type of task corresponds to a railway reservation task, and wherein the second type of task corresponds to a research conference paper submission task.

9. The computer-implemented method of claim 1, wherein the training of the sequence-to-sequence language model is based on a Schema-guided Dialogue (SGD) dataset.

10. The computer-implemented method of claim 1, wherein the training of the sequence-to-sequence language model is based on a MultiWOZ dataset.

11. The computer-implemented method of claim 1, further comprising:

applying a pre-processing script to the MultiWOZ dataset to correct one or more annotation errors.

12. A computing device for improving the functionality of task-oriented dialog systems, comprising:

one or more processors; and data storage, wherein the data storage has stored thereon computer-executable instructions that, when executed by the one or more processors, cause the computing device to carry out operations comprising:

obtaining, by the one or more processors, training data for training a sequence-to-sequence language model, wherein the training data comprises:

an input schema representation for a task, wherein the input schema representation comprises natural language descriptions of a first plurality of slot descriptions and a second plurality of intent descriptions, wherein respective indices are randomly assigned to each of the first plurality of slot descriptions and each of the second plurality of intent descriptions;

a contextual representation comprising a concatenation of a history of dialog sequences exchanged between a user and a service agent, wherein the dialog sequences describe a context for the task; and an input task comprising an unlabeled dialog;

training, by the one or more processors, the sequence-to-sequence language model, wherein training the sequence-to-sequence language model comprises:

processing, by the one or more processors, a concatenation of the input schema representation and the contextual representation, to generate a predicted sequence of dialog states for the input task by selecting a sequence of slot-value pairs corresponding to the randomly assigned indices and predicting their corresponding values for the unlabeled dialog, thereby enabling the sequence-tosequence language model to adapt to a new task domain or an unseen task domain without retraining for each task domain; and updating, by the one or more processors, and based on the processing, the sequence-to-sequence language model; and providing, by the one or more processors, the trained sequence-to-sequence language model for deployment on one or more processors of a task-oriented dialog system to dynamically predict a dialogue state for a new task using an index-picking mechanism based on randomly assigned indices.

13. The computing device of claim 12, wherein an input prompt corresponding to the input task comprises a sequence of utterances, and wherein the sequence of slot-value pairs indicates possible slots and values in the sequence of utterances.

14. The computing device of claim 12, wherein an input prompt corresponding to the input task comprises a semantic representation of the schema descriptions associated with the task.

15. The computing device of claim 12, further comprising a target comprising one or more ground truth dialog states.

16. The computing device of claim 12, the operations further comprising:

receiving, via an application programming interface (API) for a task processor, API schemata comprising schema descriptions associated with a particular task; and applying the trained sequence-to-sequence language model to predict a particular sequence of dialog states for the particular task.

17. The computing device of claim 16, wherein the training of the sequence-to-sequence language model is based on a first type of task, and wherein the applying of the trained sequence-to-sequence language model is based on a second type of task different from the first type of task.

18. The computing device of claim 12, wherein the training of the sequence-to-sequence language model is based on a Schema-guided Dialogue (SGD) dataset.

19. The computing device of claim 12, wherein the training of the sequence-to-sequence language model is based on a MultiWOZ dataset.

20. An article of manufacture for improving the functionality of task-oriented dialog systems, including a non-transitory computer-readable medium, having stored thereon program instructions that, upon execution by one or more processors of a computing device, cause the computing device to carry out operations comprising:

obtaining, by the one or more processors, training data for training a sequence-to-sequence language model, wherein the training data comprises:

an input schema representation for a task, wherein the input schema representation comprises natural language descriptions of a first plurality of slot descriptions and a second plurality of intent descriptions, wherein respective indices are randomly assigned to each of the first plurality of slot descriptions and each of the second plurality of intent descriptions;

a contextual representation comprising a concatenation of a history of dialog sequences exchanged between a user and a service agent, wherein the dialog sequences describe a context for the task; and an input task comprising an unlabeled dialog;

training, by the one or more processors, the sequence-to-sequence language model, wherein training the sequence-to-sequence language model comprises:

processing, by the one or more processors, a concatenation of the input schema representation and the contextual representation, to generate a predicted sequence of dialog states for the input task by selecting a sequence of slot-value pairs corresponding to the randomly assigned indices and predicting their corresponding values for the unlabeled dialog, thereby enabling the sequence-to-sequence language model to perform zero-shot generalization to an unseen domain without requiring new annotated training data; and updating, by the one or more processors, and based on the processing, the sequence-to-sequence language model; and providing, by the one or more processors, the trained sequence-to-sequence language model for deployment on one or more processors of a task-oriented dialog system to dynamically predict a dialogue state for a new task using an index-picking mechanism based on randomly assigned indices.

* * * * *